US008199132B1

(12) United States Patent
Oda et al.

(10) Patent No.: US 8,199,132 B1
(45) Date of Patent: Jun. 12, 2012

(54) POSITION INDICATOR

(75) Inventors: Yasuo Oda, Saitama (JP); Masaki Yagi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 12/986,849

(22) Filed: Jan. 7, 2011

(30) Foreign Application Priority Data

Dec. 14, 2010 (JP) ................................. 2010-278002

(51) Int. Cl.
*G06F 3/033* (2006.01)
(52) U.S. Cl. .................. 345/179; 178/19.03; 178/19.06
(58) Field of Classification Search ........... 345/1.1–111, 345/156–184, 204–215, 690–699; 178/19.01–19.07
See application file for complete search history.

(56) References Cited

U.S. PATENT DOCUMENTS

| 5,027,115 | A | * | 6/1991 | Sato et al. ........................ 341/13 |
| 5,159,321 | A | * | 10/1992 | Masaki et al. ................. 345/179 |
| 5,371,516 | A | * | 12/1994 | Toyoda et al. ................. 345/179 |
| 5,592,197 | A | * | 1/1997 | Tagawa ......................... 345/173 |
| 5,679,930 | A | | 10/1997 | Katsurahira |
| 5,684,505 | A | * | 11/1997 | Takita et al. ................... 345/104 |
| 5,736,980 | A | * | 4/1998 | Iguchi et al. ................... 345/179 |
| 5,790,106 | A | * | 8/1998 | Hirano et al. .................. 345/173 |
| 5,798,756 | A | * | 8/1998 | Yoshida et al. ................ 345/179 |
| 5,825,345 | A | * | 10/1998 | Takahama et al. ............ 345/104 |
| 5,828,011 | A | | 10/1998 | Partow et al. |
| 5,835,076 | A | * | 11/1998 | Machida et al. .............. 345/104 |
| 5,854,448 | A | * | 12/1998 | Nozaki et al. ................ 178/18.01 |
| 5,854,881 | A | * | 12/1998 | Yoshida et al. ................ 345/104 |
| 5,914,708 | A | * | 6/1999 | LaGrange et al. ............ 345/179 |
| 6,091,030 | A | * | 7/2000 | Tagawa et al. ............... 178/18.01 |
| 6,937,231 | B2 | * | 8/2005 | Fujitsuka et al. ............. 345/179 |
| 7,696,444 | B2 | * | 4/2010 | Liu et al. ...................... 178/19.03 |
| 7,719,515 | B2 | * | 5/2010 | Fujiwara et al. .............. 345/156 |
| RE41,521 | E | * | 8/2010 | Fukushima et al. .......... 345/179 |
| 7,812,268 | B2 | * | 10/2010 | Ely ................................ 178/18.03 |
| 2001/0038384 | A1 | * | 11/2001 | Fukushima et al. .......... 345/179 |
| 2003/0197691 | A1 | * | 10/2003 | Fujiwara et al. .............. 345/179 |

(Continued)

FOREIGN PATENT DOCUMENTS

JP 06-119101 4/1994

(Continued)

OTHER PUBLICATIONS

Taiwan IPO Search Report for corresponding TW Application No. 100101253, dated Jun. 13, 2011, 2 pages.

(Continued)

*Primary Examiner* — Lun-Yi Lao
*Assistant Examiner* — Gene W Lee
(74) *Attorney, Agent, or Firm* — Seed IP Law Group PLLC

(57) ABSTRACT

A position indicator is provided for use with a position detecting sensor that carries out position detection by detecting a change in capacitance. The position indicator includes: a first electrode configured to receive an alternating-current (AC) signal from the position detecting sensor; a signal enhancing processing circuit configured to subject the AC signal received via the first electrode to determined signal enhancing processing; and a second electrode different from the first electrode and configured to be supplied with a signal output from the signal enhancing processing circuit. An enhanced signal having a determined correlation with the AC signal received via the first electrode from the position detecting sensor is formed while the enhanced signal is sent out to the position detecting sensor via the second electrode.

14 Claims, 8 Drawing Sheets

U.S. PATENT DOCUMENTS

| | | | |
|---|---|---|---|
| 2005/0162411 A1* | 7/2005 | Berkel van | 345/179 |
| 2009/0114459 A1* | 5/2009 | Fukushima et al. | 178/19.03 |
| 2010/0053120 A1* | 3/2010 | Chang et al. | 345/179 |
| 2010/0117994 A1* | 5/2010 | Fukushima et al. | 345/179 |
| 2010/0207607 A1 | 8/2010 | Katsurahira et al. | |
| 2010/0212976 A1 | 8/2010 | Baba | |
| 2011/0192658 A1* | 8/2011 | Fukushima et al. | 178/19.03 |

FOREIGN PATENT DOCUMENTS

| | | |
|---|---|---|
| JP | 7295722 A | 11/1995 |
| JP | 08-179887 | 7/1996 |
| JP | 8272509 A | 10/1996 |
| JP | 2005-149140 | 6/2005 |
| JP | 2007164356 A | 6/2007 |
| JP | 2007183809 A | 7/2007 |
| JP | 2010-067117 | 3/2010 |
| TW | M366123 U1 | 10/2009 |
| TW | 201101125 A1 | 1/2011 |

OTHER PUBLICATIONS

Extended European Search Report dated Jul. 18, 2011, for corresponding EP Application No. 11156991.9, 7 pages.

* cited by examiner

FIG. 2A
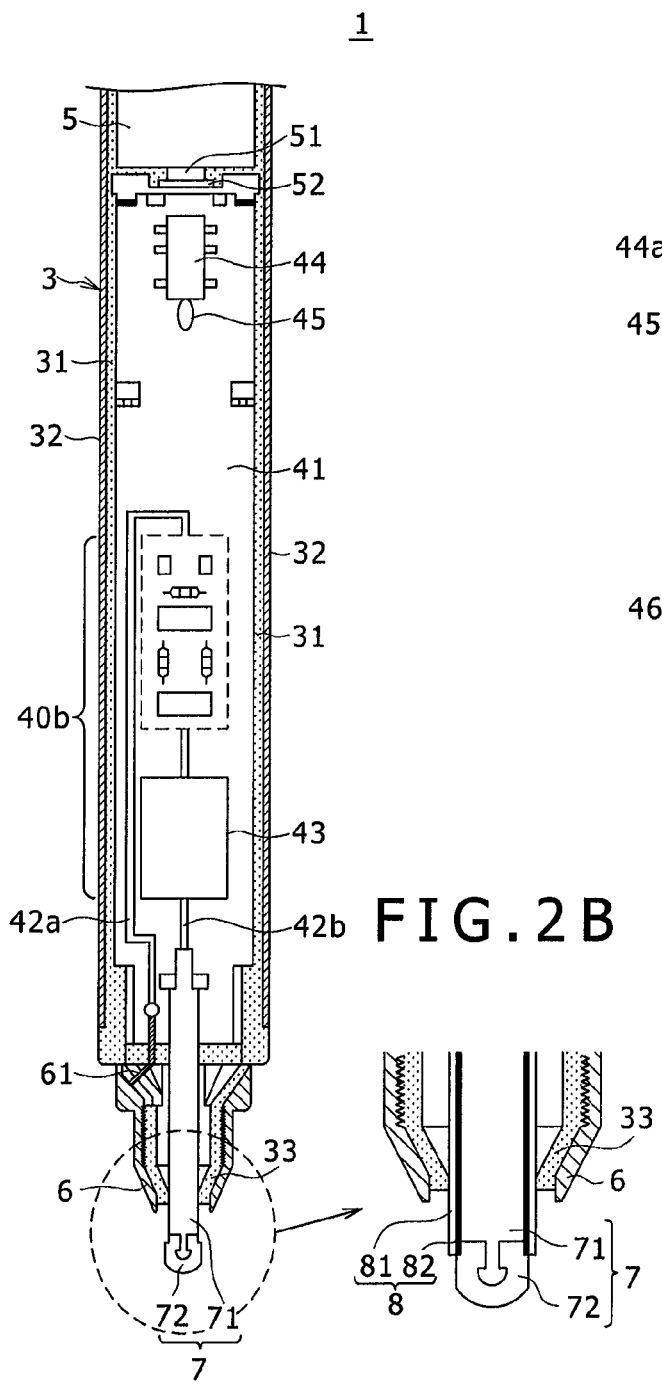
FIG. 2C
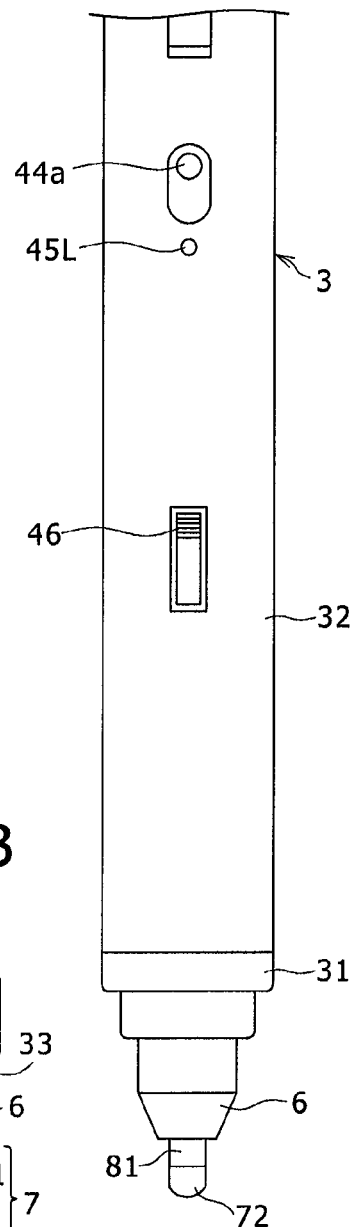
FIG. 2B

FIG. 9
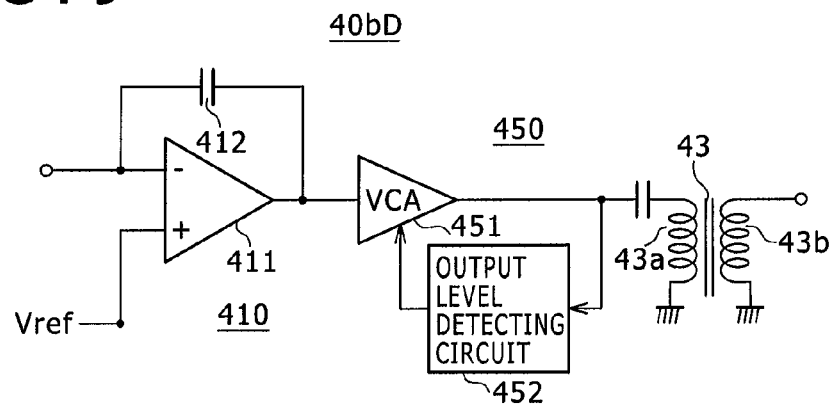
FIG. 10A
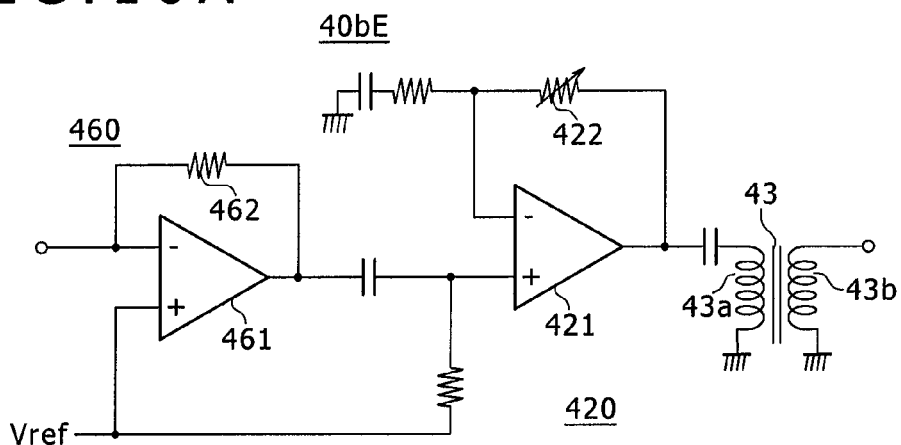
FIG. 10B
FIG. 10C
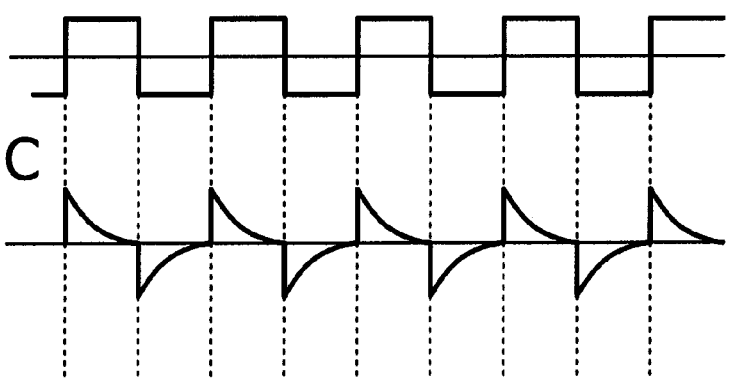

POSITION INDICATOR

CROSS-REFERENCE TO RELATED APPLICATION

The present application claims priority under 35 U.S.C. §119(a) of Japanese Application No. 2010-278002, filed Dec. 14, 2010, the entire content of which is incorporated herein by reference.

TECHNICAL FIELD

The present invention relates to a position indicator used in conjunction with a position detecting sensor in which position detection is carried out by detecting a change in capacitance.

BACKGROUND ART

In general, a capacitance type position detecting sensor in which position detection is carried out by detecting a change in capacitance needs a certain level of capacitance or higher (normally about 1 pF) that occurs between the position detecting sensor and a position indicator in order to detect the position of the position indicator with high accuracy. Thus, an input operation on the position detecting sensor is performed by a fingertip or a dedicated electrostatic pen having a relatively large area at a time of contact. That is, it is difficult from a viewpoint of detection sensitivity to detect a fine input position on the position detecting sensor by an electrostatic pen in the shape of a stylus having a fine tip.

Various techniques for solving this problem have conventionally been proposed. For example, Patent Document 1 (Japanese Patent Laid-Open No. Hei 7-295722) and Patent Document 2 (Japanese Patent Laid-Open No. Hei 8-272509) disclose a coordinate input device that has an alternating-current (AC) signal generator within a position indicator, and which detects the position of the position indicator by detecting a signal corresponding to the AC signal sent out from the position indicator in a position detecting sensor. In these Patent Documents 1 and 2, the AC signal sent out from the position indicator to the position detecting sensor has a large amplitude, thereby enabling position detection even with the position indicator formed by an electrostatic pen having a fine tip.

Specifically, Patent Document 1 shows a structure in which a signal oscillator 1 is provided within a signal pen 5, an AC signal of a large amplitude is generated by the signal oscillator 1, and the generated AC signal is applied between a stylus conductor 3 and a ring-shaped conductor 4 in the tip section of the signal pen 5. Patent Document 2 shows a structure in which a sine wave generator is provided in a stylus 6, and a sine wave AC signal is boosted by using a transformer and then supplied to a tip 2 of the stylus.

Patent Document 3 (Japanese Patent Laid-Open No. 2007-183809) shows the following structure. When a tip section 2 of a stylus input device 1 touches the surface of a capacitance type touch panel 51, a movable contact of a switching circuit 3 is switched to the side of a fixed contact 3a, and a phase comparator 5 is set in an operating state. As a result, an AC reference signal Vi of a frequency Fo, which signal is generated by a reference signal source 54 in a capacitance detection type coordinate input device 50, is received via the tip section 2, and then supplied to one input of the phase comparator 5 via the fixed contact 3a of the switching circuit 3. Because of this structure, a PLL circuit including the phase comparator 5 is phase-synchronized with the AC reference signal Vi, and outputs a signal of the same frequency as that of the AC reference signal Vi.

When the movable contact of the switching circuit 3 is switched to a fixed contact 3b, the phase comparator 5 is set in a non-operating state. However, the stylus input device 1 outputs a signal that is phase-synchronized with and having the same frequency as that of the AC reference signal Vi, which is generated in the reference signal source 54 in the capacitance detection type coordinate input device 50 due to a flywheel effect of the PLL circuit. A signal having an opposite phase from the output signal and an amplitude Vneg exceeding a power supply voltage Vcc is output via the tip section 2 of the stylus input device 1.

PRIOR ART DOCUMENT

Patent Document

Patent Document 1
Japanese Patent Laid-Open No. Hei 7-295722
Patent Document 2
Japanese Patent Laid-Open No. Hei 8-272509
Patent Document 3
Japanese Patent Laid-Open No. 2007-183809

SUMMARY OF THE INVENTION

However, the position indicators described in Patent Document 1 and Patent Document 2 have an AC signal generator, and have the structure of unidirectional signal transmission for transmitting the AC signal generated in the generator to the position detecting sensor. Thus, the position indicator need to have the AC signal generator adapted to the AC signal used by the position detecting sensor. Cost is correspondingly increased, and the position indicator compatible with the respective position detecting sensor need to be provided, so that the versatility of the position indicator is impaired.

The position indicator to which the techniques of Patent Document 3 are applied has a structure of so-called half-duplex communication, in which an AC signal from the position detecting sensor is received by a conductor in the tip of the pen, and an AC signal synchronized with the received signal is generated and sent out from the same conductor in the tip of the pen to the position detecting sensor. That is, in the position indicator of Patent Document 3, the conductor in the tip of the pen is shared for both the reception and transmission of the AC signals, so that reception and transmission cannot be performed simultaneously, and a switch circuit for switching the tip of the pen for a signal receiving period and a signal transmitting period needs to be provided.

In addition, in the position indicator of Patent Document 3, an output AC signal in opposite phase from and in synchronism with the received AC signal is generated by the PLL circuit only in the signal receiving period. Then, in the signal transmitting period, the signal from the PLL circuit is output as the output AC signal. Thus, signal continuity or phase relation between the received AC signal and the output AC signal may not necessarily be guaranteed.

As described above, the position indicator of Patent Document 3 has a structure for generating a new signal corresponding to the received AC signal by using the PLL circuit, and thereafter sending out the signal generated by the PLL circuit using the same conductor in the tip of the pen by switching the switch circuit. Thus, because the position indicator of Patent Document 3 includes the switch circuit, the continuity or real-time characteristic of the output AC signal may be impaired. In addition, because the PLL circuit generates a new signal, waveform correlation between the signal waveform of the input signal and the signal waveform of the output signal may not necessarily be guaranteed.

In view of the above points, according to one aspect of the present invention, a position indicator is provided that has a high affinity to a position detecting sensor, has high versatility, and ensures a determined waveform correlation between an input signal and an output signal, by having a structure of so-called full-duplex communication in which a signal input channel and a signal output channel are present independently of each other. The position indicator is to be used in conjunction with the position detecting sensor that carries out position detection by detecting a change in capacitance.

In order to solve the above-described problems, a position indicator according to the present invention is a position indicator for use in conjunction with a position detecting sensor for carrying out position detection by detecting a change in capacitance, and the position indicator includes the following: a first electrode configured to receive an AC signal from the position detecting sensor; a signal enhancing processing circuit configured to subject the AC signal received via the first electrode to predetermined signal enhancing processing; and a second electrode different from the first electrode, the second electrode being supplied with a signal output from the signal enhancing processing circuit. The first electrode and the second electrode are both disposed at the same end section of the position indicator. An enhanced signal is formed having a determined correlation with the AC signal received via the first electrode from the position detecting sensor, and while the enhanced signal is sent out to the position detecting sensor via the second electrode.

The position detecting sensor detects a change in the received signal of the AC signal at a position indicated by the position indicator according to the present invention, and thereby detects the position indicated by the position indicator. The position indicator according to the present invention having the above-described structure subjects the AC signal received from the position detecting sensor via the first electrode to signal enhancing processing by the signal enhancing processing circuit, and then feeds back the AC signal to the position detecting sensor via the second electrode.

Thus, in the position detecting sensor, the change in the received signal of the AC signal at the position indicated by the position indicator according to the present invention is increased, so that sensitivity of detection of the position indicator in the position detecting sensor is improved.

According to the present invention, it is possible to provide a position indicator that has a simple configuration, has a high affinity to a position detecting sensor, has high versatility, and ensures a determined waveform correlation between an input signal and an output signal, so that position detection can be made with high sensitivity, as a position indicator for use in conjunction with the position detecting sensor that carries out position detection by detecting a change in capacitance.

BRIEF DESCRIPTION OF THE DRAWINGS

FIGS. 2A, 2B, and 2C are diagrams showing an example of a structure of the first embodiment of the position indicator according to the present invention.

FIG. 9 is a circuit diagram showing an example of a part of a signal processing circuit in a fifth embodiment of the position indicator according to the present invention.

FIG. 10A is a circuit diagram showing an example of a part of a signal processing circuit in a sixth embodiment of the position indicator according to the present invention, and FIGS. 10B and 10C are waveform charts of assistance in explaining the example.

DESCRIPTION OF THE INVENTION

First Embodiment

Figure 1:
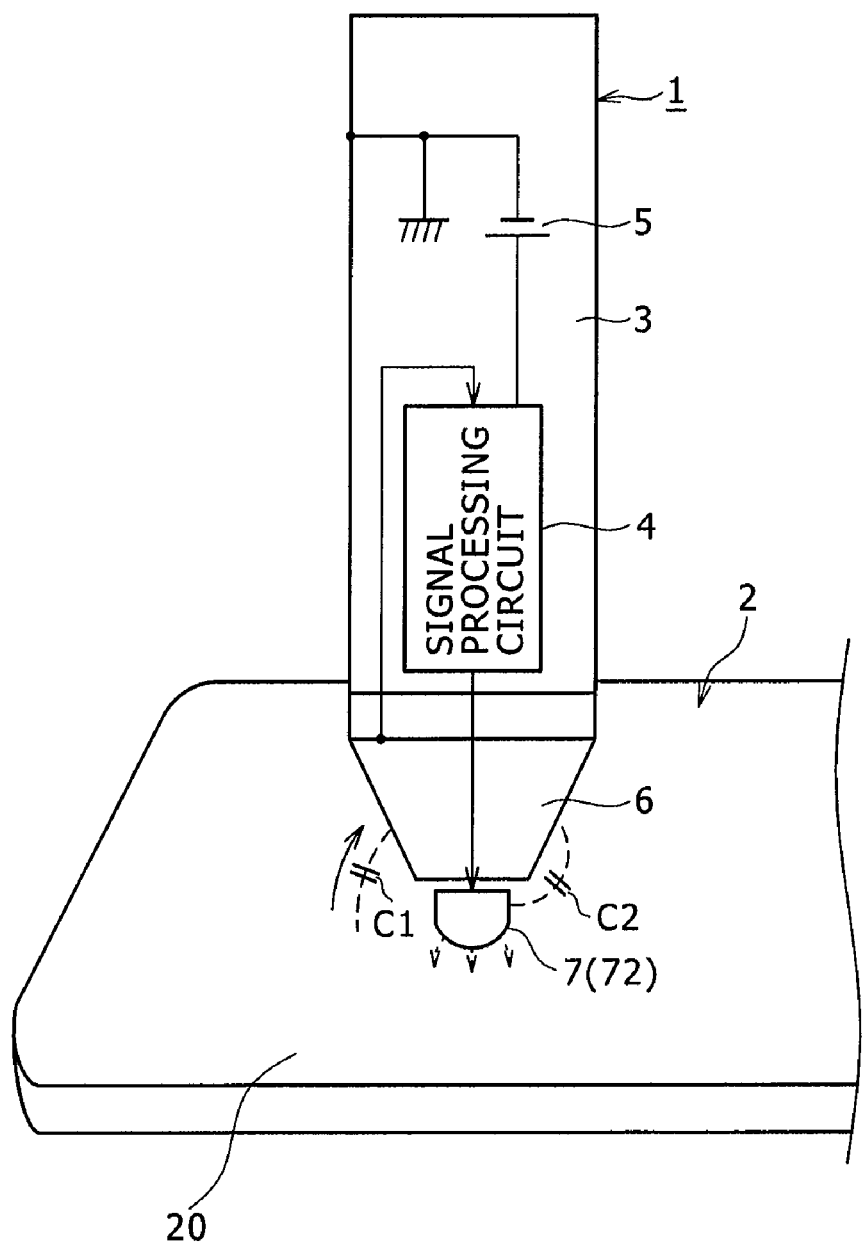
FIG. 1 is a diagram explaining a conceptual structure of a first embodiment of a position indicator according to the present invention and a processing operation of the position indicator.

Preferred embodiments of a position indicator according to the present invention will hereinafter be described with reference to the drawings. FIG. 1 is a diagram of assistance in generally explaining a conceptual structure of a position indicator 1 according to a first embodiment of the present invention and a processing operation of the position indicator 1. FIG. 1 shows a state in which the position indicator 1 is positioned on a plate surface of a capacitance type position detecting sensor 2. FIGS. 2A to 2C are diagrams of assistance in explaining an example of a detailed configuration of the position indicator 1. FIG. 2A is a partial longitudinal sectional view of the position indicator 1 and FIG. 2B is a partial enlarged view of FIG. 2A. FIG. 2C is a diagram showing a part of an external appearance of the position indicator 1. In the present embodiment, the position indicator 1 is formed as a position indicator whose external appearance has the form of a stick-shaped stylus.

The position indicator 1 according to the present embodiment has a stick-shaped casing 3. This casing 3 is formed by a hollow cylindrical-shaped insulator section 31 made of an insulating material, for example a synthetic resin. In the present embodiment, at least a part of an outer peripheral surface of the insulator section 31 of the casing 3, by which part the position indicator 1 is held by an operator, is covered by a conductor section 32 made of a metal, for example.

A printed wiring board 41 is provided within the casing 3. The conductor section 32 covering the outer peripheral surface of the casing 3 is electrically connected to a grounding conductor of the printed wiring board 41.

A signal processing circuit 4 (FIG. 1) is formed on the printed wiring board 41. As shown in FIG. 2A, the signal processing circuit 4 formed on the printed wiring board 41 includes a plurality of electronic parts formed by a resistor, a capacitor, an IC (Integrated Circuit), and the like, wiring patterns such as conducting patterns 42a and 42b and the like, a transformer 43 to be described later, and the like as well as a power supply switch 44, an LED (Light Emitting Diode) 45 and the like in the present example.

In the present embodiment, a battery 5 is formed so as to be able to be housed within the casing 3. A power supply voltage of the signal processing circuit 4 is generated in the battery 5. A terminal 52 in FIG. 2A is a terminal connected electrically to a power supply circuit included in the signal processing circuit 4 on the printed wiring board 41. The cathode side electrode 51 of the battery 5 is electrically connected to the terminal 52 in a state of being in contact with the terminal 52. Though not shown, an anode side electrode of the battery is directly connected to the grounding conductor of the printed wiring board 41, or brought into pressed-contact with a terminal, which undergoes elastic displacement and is connected to the grounding conductor of the printed wiring board 41 via the conductor section 32 of the casing 3.

As shown in FIG. 2C, an operating element 44a of the power supply switch 44 disposed on the printed wiring board 41 is provided so as to be externally operable through an opening provided in the casing 3. The power supply switch 44 can be turned on or off by sliding movement of the operating element 44a by a user.

The position indicator 1 is configured such that the LED 45 is lit when power is turned on by turning on the power supply switch 44 by an operation of the operating element 44a, and such that the LED 45 is deactivated when the power is turned off by turning off the power supply switch 44. A translucent member 45L is provided at a position corresponding to the position of the LED 45 in the outer peripheral surface of the casing 3. The user can check whether the LED 45 is lit or not through the translucent member 45L.

In addition, a slide operating section 46 is provided in the outer peripheral surface of the casing 3, for allowing a user to manually change the resistance value of a variable resistor 422 provided in the signal processing circuit (FIG. 3), to be described later.

A tapered section 33 that gradually tapers off is formed on one end side in the direction of a center line of the hollow cylindrical-shaped insulator section 31 forming the casing 3. A peripheral electrode 6 made of a ring-shaped conducting metal, for example, is attached to the outer circumference side of the tapered section 33. Incidentally, the peripheral electrode 6 and the conductor section 32 on the outer peripheral surface of the casing 3 are insulated from each other by the interposition of the insulator section 31 between the peripheral electrode 6 and the conductor section 32.

The peripheral electrode 6 forms a first electrode in the present example. The peripheral electrode 6 is electrically connected to the conducting pattern 42a on the printed wiring board 41 by a lead conducting member 61 penetrating through the insulator section 31. The conducting pattern 42a in the present example is connected to an input terminal of the signal processing circuit 4.

In addition, in the present embodiment, a central electrode 7 is provided so as to project from a hollow part of the tapered section 33 to the outside. The central electrode 7 includes for example a stick-shaped conductor 71 made of a conductive metal and an elastic protective conductor 72 provided at an end of the stick-shaped conductor 71. The stick-shaped conductor 71 is provided so as to penetrate from the position of the printed wiring board 41 within the casing 3 through the hollow part of the tapered section 33 and project to the outside. The elastic protective conductor 72 is a member for preventing the indicating input surface of the position detecting sensor 2 from being scratched and for increasing the area of contact of the position indicator 1 with the indicating input surface when the position indicator 1 is in contact with the position detecting sensor 2. The elastic protective conductor 72 is formed by a conductive elastic rubber in the present example. Incidentally, this elastic protective conductor 72 may be omitted. In this case, the stick-shaped conductor 71 is desirably formed by a conductive elastic member, for example.

The central electrode 7 forms a second electrode in the present example. An end part of the stick-shaped conductor 71 on an opposite side from the side where the elastic protective conductor 72 is provided is fixed to the printed wiring board 41, and is electrically connected to the conducting pattern 42b. The conducting pattern 42b in the present example is connected to an output terminal of the signal processing circuit 4.

In addition, a shielding member 8 for effectively preventing an electrical interference between the peripheral electrode 6 and the central electrode 7 is provided between the peripheral electrode 6 and the central electrode 7. In the present embodiment, the shielding member 8 is provided so as to surround the central electrode 7. Thereby, the shielding member 8 is interposed between the peripheral electrode 6 and the central electrode 7 to minimize a coupling capacitance between the peripheral electrode 6 and the central electrode 7.

As shown in FIG. 2B, which is a partial enlarged view of FIG. 2A, the shielding member 8 is formed by a tubular conductor 81 made of a conducting metal having an insulating layer 82 formed on an inner wall surface of the tubular conductor 81. The tubular conductor 81 is electrically connected to the grounding conductor of the printed wiring board 41.

The stick-shaped conductor 71 of the central electrode 7 is housed within a hollow part of the tubular conductor 81 having the insulating layer 82 on the inner wall surface of the tubular conductor 81, whereby the central electrode 7 is surrounded by the shielding member 8. In the example of FIG. 2B, a part of the elastic protective conductor 72 of the central electrode 7 is also surrounded by the tubular conductor 81 of the shielding member 8.

The peripheral electrode 6 and the tubular conductor 81 of the shielding member 8 are insulated from each other by the interposition of the tapered section 33 of the insulator section 31 between the peripheral electrode 6 and the tubular conductor 81. The central electrode 7 and the tubular conductor 81 of the shielding member 8 are insulated from each other by the interposition of the insulating layer 82 on the inner wall surface of the tubular conductor 81 of the shielding member 8 between the central electrode 7 and the tubular conductor 81.

Incidentally, while only the central electrode 7 is shielded in the example of FIG. 2B, the peripheral electrode 6 may be shielded instead. Alternatively, both of the peripheral electrode 6 and the central electrode 7 may be shielded.

In addition, while shielding is provided by surrounding the entire stick-shaped conductor 71 of the central electrode 7 with the shielding member 8, it suffices to interpose the shielding member in at least a part where the peripheral electrode 6 and the central electrode 7 are in proximity to each other.

Figure 3:
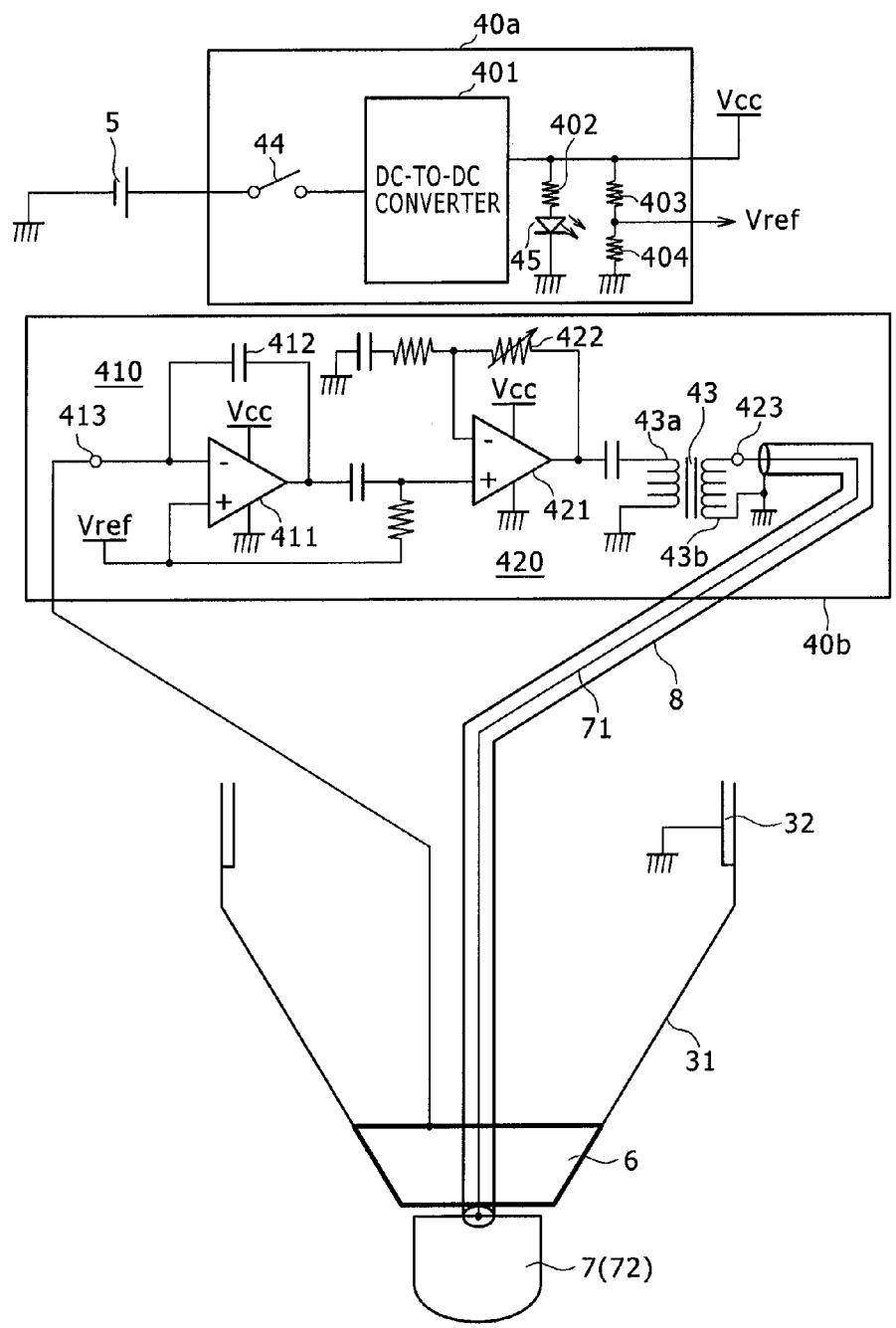
FIG. 3 is a circuit diagram showing an example of a signal processing circuit in the first embodiment of the position indicator according to the present invention.

An example of configuration of the signal processing circuit 4 will next be described. FIG. 3 is a diagram showing an example of circuit configuration of the signal processing circuit 4. The signal processing circuit 4 in the present example includes a power supply circuit section 40a and a signal processing section 40b. The power supply circuit section 40a includes a DC-to-DC converter 401. The DC-to-DC converter 401 generates a power supply voltage +Vcc from the voltage of the battery 5, and supplies the power supply voltage +Vcc to the signal processing section 40b.

The power supply circuit section 40a has a power supply switch 44 between the DC-to-DC converter 401 and the battery 5. In addition, a series circuit of a resistance 402 and the LED 45 is connected between the output terminal of the DC-to-DC converter 401 and the grounding conductor. Further, the output terminal of the DC-to-DC converter 401 is connected to the grounding conductor via a series connection of a resistance 403 and a resistance 404. A reference voltage Vref (=Vcc/2) is output from the point of connection between the resistance 403 and the resistance 404.

As described above, when the power supply switch 44 is turned on by operating the operating element 44a provided in the casing 3, the voltage of the battery 5 is supplied to the DC-to-DC converter 401, where the power supply voltage Vcc is generated, and at the same time, the LED 45 is lit to inform the user that the power is on. When the power supply switch 44 is turned off by operating the operating element 44a, the supply of the voltage of the battery 5 to the DC-to-DC converter 401 is stopped, the generation of the power supply voltage Vcc is stopped, and the LED 45 is turned off to inform the user that the power is off.

The signal processing section 40b forms a signal enhancing processing circuit. The signal processing section 40b in the present embodiment includes a sense amplifier 410, a variable signal amplification factor circuit 420, and a transformer 43.

Signal enhancing processing performed in the signal enhancing processing circuit in the present invention includes not only processing for amplifying the signal level of an input signal to a determined signal level but also processing for modifying the waveform of the input signal or processing for controlling the phase of the input signal. For example, when the input signal has a signal waveform such as that of a sine wave or the like, the signal enhancing processing includes increasing a rate of change of the signal level of the input signal in a region where the signal level is low and decreasing the rate of change in a region where the signal waveform is at a maximum value or a minimum value. When the input signal has a signal waveform such as that of a rectangular wave or the like, the signal enhancing processing includes forming the signal waveform into a steep signal waveform by increasing a rate of change of the signal level of the input signal in a region of a rising edge of the signal waveform or a region of a falling edge of the signal waveform, or increasing amplitude level in the region. Further, compensation for a phase difference with respect to the input signal, or phase control performed so as to retain a predetermined phase difference, can be applied. In the signal enhancing processing circuit, signal enhancing processing is performed with each of such signal processing methods combined with the above-described signal level amplifying processing, or with each of such signal processing methods applied independently of the signal level amplifying processing.

In the present example, the sense amplifier 410 includes an operational amplifier 411 and a capacitor 412 connected between the inverting input terminal and the output terminal of the operational amplifier 411. The inverting input terminal of the operational amplifier 411 is connected to a connecting terminal 413 connected to the peripheral electrode 6. In addition, the non-inverting input terminal of the operational amplifier 411 is supplied with the above-described reference voltage Vref.

When the position indicator 1 is on the position detecting sensor 2, the peripheral electrode 6 of the position indicator 1 and the position detecting sensor 2 are coupled to each other via a capacitance C1, as shown in FIG. 1. As will be described later, an alternating-current (AC) signal (i.e., a current based on an alternating voltage) flows in the position detecting sensor 2. Thus, the AC signal is supplied as a current signal to the connecting terminal 413 via the capacitance C1 and the peripheral electrode 6, and input to the sense amplifier 410. The capacitor 412 is to detect the current signal input via the capacitance C1. In the present invention, the AC signal may have any waveform. AC signals of any waveform, such as rectangular wave signals, sine wave signals and the like, can be input.

Then, the sense amplifier 410 inverts the phase of the AC signal input as current signal via the connecting terminal 413, and outputs the resulting AC signal to the variable signal amplification factor circuit 420.

The variable signal amplification factor circuit 420 includes an operational amplifier 421 and a variable resistor 422 connected between the inverting input terminal and the output terminal of the operational amplifier 421. The resistance value of the variable resistor 422 is variably controlled by the user manually by sliding movement of the slide operating section 46 shown in FIG. 2C. Then, by variably setting the resistance value of the variable resistor 422 manually, the amplification factor of the variable signal amplification factor circuit 420 is variably set. As a result, the signal detection sensitivity of the position indicator is controlled.

The AC signal amplified by the variable signal amplification factor circuit 420 is supplied to the primary winding 43a of the transformer 43. A ratio between the number of turns n1 of the primary winding 43a of the transformer 43 and the number of turns n2 of the secondary winding 43b of the transformer 43 is set such that the number of turns on the side of the secondary winding 43b is larger (n1<n2), such as n1:n2=1:10, for example. Thus, on the side of the secondary winding 43b of the transformer 43, the amplitude of an output signal of the variable signal amplification factor circuit 420 is multiplied according to the turns ratio, so that an AC signal (voltage signal) of large amplitude is obtained.

One end of the secondary winding 43b of the transformer 43 is connected to a connecting terminal 423 connected to the stick-shaped conductor 71 of the central electrode 7 shielded by the shielding member 8. Another end of the secondary winding 43b of the transformer 43 is connected to the grounding conductor of the printed wiring board 41. Thus, an output signal set as an AC signal voltage of large amplitude by the signal processing section 40b is supplied to the central electrode 7 via the connecting terminal 423.

When the position indicator 1 is on the position detecting sensor 2, the central electrode 7 of the position indicator 1 and the position detecting sensor 2 are coupled to each other via a capacitance. Therefore the AC signal is fed back from the position indicator 1 to the position detecting sensor 2 via the central electrode 7 of the position indicator 1.

Description will next be made of the capacitance type position detecting sensor 2 in the present example. The capacitance type position detecting sensor 2 in the present example has the configuration of a position detecting sensor of a mutual capacitance system, in which a sensor electrode is composed of an input electrode and an output electrode, and a change in the coupling capacitance of a touch point touched by the position indicator 1 is detected.

Figure 4:
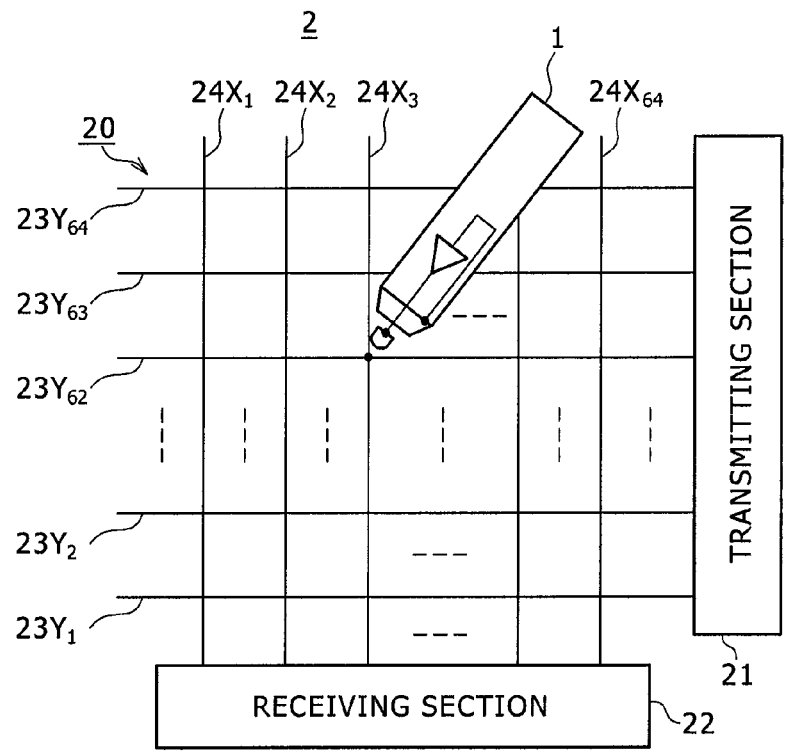
FIG. 4 is a diagram explaining an example of a position detecting sensor with which the position indicator according to the present invention is used.

Specifically, as shown in FIG. 4, the position detecting sensor 2 in the present example includes a sensor section 20, a transmitting section 21, and a receiving section 22. The sensor section 20 includes a plurality of linear transmitting conductors, or 64 transmitting conductors $23Y_1, 23Y_2, \ldots, 23Y_{64}$ in the present example, that extend in a lateral direction (X-axis direction) of the indicating input surface as well as a plurality of receiving conductors, or 64 receiving conductors $24X_1, 24X_2, \ldots, 24X_{64}$ in the present example, that are orthogonal to the transmitting conductors $23Y_1$ to $23Y_{64}$ and which extend in a longitudinal direction (Y-axis direction) of the indicating input surface. The plurality of transmitting conductors $23Y_1$ to $23Y_{64}$ are arranged at equal intervals in the Y-axis direction, and are connected to the transmitting section 21. The plurality of receiving conductors $24X_1$ to $24X_{64}$ are arranged at equal intervals in the X-axis direction, and are connected to the receiving section 22.

Incidentally, when the 64 transmitting conductors $23Y_1$ to $23Y_{64}$ do not need to be individually distinguished from each other in the description of the transmitting conductors in the present specification, the transmitting conductors $23Y_1$ to $23Y_{64}$ will be referred to as transmitting conductors 23Y. Similarly, when the 64 receiving conductors $24X_1$ to $24X_{64}$ do not need to be individually distinguished from each other in the description of the receiving conductors, the receiving conductors $24X_1$ to $24X_{64}$ will be referred to as receiving conductors 24X.

The plurality of transmitting conductors 23Y are for example formed in a plane on the lower side of a substrate. The plurality of receiving conductors 24X are formed in a plane on the upper side of the substrate. Thus, the plurality of transmitting conductors 23Y and the plurality of receiving conductors 24X are arranged at a predetermined distance corresponding to a predetermined thickness of the substrate, have an arrangement relation in which the plurality of transmitting conductors 23Y and the plurality of receiving conductors 24X are orthogonal to each other, and form a plurality of points of intersection (cross points). A transmitting conductor 23Y and a receiving conductor 24X at each cross point can be considered to be coupled to each other via a predetermined capacitance.

The transmitting section 21 supplies a predetermined AC signal to the transmitting conductors 23Y. In this case, the transmitting section 21 may supply an identical AC signal to the plurality of transmitting conductors $23Y_1, 23Y_2, \ldots, 23Y_{64}$ while sequentially selecting the plurality of transmitting conductors $23Y_1, 23Y_2, \ldots, 23Y_{64}$ one at a time, or may simultaneously supply a plurality of AC signals different from each other to the plurality of transmitting conductors $23Y_1, 23Y_2, \ldots, 23Y_{64}$. In addition, the plurality of transmitting conductors $23Y_1, 23Y_2, \ldots, 23Y_{64}$ may be divided into a plurality of groups, and different AC signals may be used in different groups.

The receiving section 22 detects a signal component resulting from the AC signal supplied to the transmitting conductors 23Y being transmitted to each of the receiving conductors $24X_1, 24X_2, \ldots, 24X_{64}$ via the predetermined capacitance. Supposing that coupling capacitances between the transmitting conductors 23Y and the receiving conductors 24X are equal to each other at all the cross points, the receiving section 22 detects a received signal at a predetermined level from all the receiving conductors $24X_1, 24X_2, \ldots, 24X_{64}$ of the sensor section 20 when the position indicator 1 is not present on the sensor section 20.

When the position indicator 1 touches the sensor section 20, on the other hand, a transmitting conductor 23Y and a receiving conductor 24X forming a cross point at the contact position and the position indicator 1 are coupled to each other via a capacitance. That is, the capacitance at that cross point is changed by the position indicator 1, and the level of a received signal obtained from the receiving conductor 24X at the cross point where the position indicator 1 is present is changed from that of the other cross points.

The receiving section 22 detects the position of the position indicator 1 by sensing the receiving conductor 24X whose received signal is changed in level among the plurality of receiving conductors $24X_1, 24X_2, \ldots, 24X_{64}$. Then, a control section of the position detecting sensor 2 (not shown in the figures) detects the cross point touched by the position indicator 1 by detecting the transmitting conductor 23Y, to which the AC signal is supplied from the transmitting section 21, and the receiving conductor 24X whose received signal is changed in level in the receiving section 22.

Also when a finger rather than the position indicator 1 has approached or touched the sensor section 20, the position detecting sensor 2 detects a cross point approached or touched by the finger on similar principles. In this case, a part of the AC signal supplied to a transmitting conductor 23Y flows through the finger and the human body of the user to the ground. Therefore, a signal received by a receiving conductor 24X forming the cross point where the finger is present is changed in level. The receiving section 22 detects the receiving conductor 24X forming the cross point where the finger is present by detecting the change in level of the received signal.

Also in the case of the position indicator in the shape of a stylus, the position detecting sensor can detect an indicated position on the sensor section 20 on similar principles to those of detection of a finger position. However, as described earlier, in the case of the position indicator in the shape of a stylus, an area of contact between the position indicator and the position detecting sensor is not so large as in the case of a finger, thus resulting in a low coupling capacitance and low detection sensitivity of the position detecting sensor.

On the other hand, as will be described below, the position indicator 1 according to the present embodiment has a high affinity to the position detecting sensor 2, has high versatility, and ensures a determined waveform correlation between an input signal and an output signal, so that position detection on the sensor section 20 can be made with high sensitivity.

Specifically, as shown in FIG. 1, when the position indicator 1 according to the present embodiment is brought into proximity or contact with the sensor section 20 of the position detecting sensor 2, the peripheral electrode 6 and the sensor section 20 are coupled to each other via the capacitance C1. Then, the AC signal supplied to a transmitting conductor 23Y is input as a current signal to the signal processing circuit 4 via the capacitance C1, the peripheral electrode 6, and the connecting terminal 413.

The AC signal (current signal) input to the signal processing circuit 4 is subjected to signal enhancing processing by being subjected to phase inversion in the sense amplifier 410 of the signal processing section 40b, and thereafter being amplified in the variable signal amplification factor circuit 420 and boosted (multiplied) by the transformer 43, and supplied as a voltage signal to the central electrode 7 via the connecting terminal 423. That is, the AC signal input from the sensor section 20 to the signal processing circuit 4 via the peripheral electrode 6 is converted into a signal of opposite phase and large amplitude in the signal processing section 40b, and fed back to the sensor section 20 via the central electrode 7.

In this case, the AC signal fed back from the central electrode 7 in the position indicator 1 to the sensor section 20 in the position detecting sensor 2 is an enhanced signal of opposite phase from the AC signal supplied to the transmitting conductor 23Y. The position indicator 1 therefore functions to further increase a change in the AC signal in the signal received by the receiving conductor 24X. The position detecting sensor 2 can thus detect the contact position of the position indicator 1 with high sensitivity. Incidentally, detecting operation is further stabilized when the ground of the position indicator 1 is connected to a human body. Specifically, in the present embodiment, the casing 3 of the position indicator 1 is covered with the conductor section 32 connected to the grounding conductor of the printed wiring board 41 on which the signal processing circuit 4 is formed. Thus, the AC signal supplied to the transmitting conductor 23Y in the position detecting sensor 2 flows to the ground through the position indicator 1 and the human body of the user, whereby signal detecting operation can be further stabilized.

Letting V be the voltage of the transmitting conductor 23Y of the sensor section 20 in the position detecting sensor 2, e be the voltage of the central electrode 7 in the position indicator 1 according to the present embodiment, and C2 be a capacitance between the peripheral electrode 6 and the central electrode 7 (see FIG. 1), there is a relation:

$$e \leq C1/C2 \cdot V$$

It is therefore advantageous to minimize the capacitance C2 between the peripheral electrode 6 and the central electrode 7 in raising the potential e of the central electrode 7.

For this, in the position indicator 1 according to the present embodiment, the shielding member 8 is interposed between the peripheral electrode 6 and the central electrode 7, whereby coupling between the peripheral electrode 6 and the central electrode 7 is minimized. Thus, in the position indicator 1 according to the present embodiment, the interposition of the shielding member 8 can reduce the capacitance C2 between the peripheral electrode 6 and the central electrode 7, increase the voltage e, and enhance sensitivity efficiently.

In addition, in the position indicator 1 according to the present embodiment, the user manually adjusts the slide operating section 46 to vary the resistance value of the variable resistor 422 and to thus variably set the amplification factor of the variable signal amplification factor circuit 420, whereby sensitivity of detection of a position indicated by the position indicator 1 in the position detecting sensor 2 can be adjusted.

Specifically, in a state of the central electrode 7 of the position indicator 1 lightly touching the surface of the sensor section 20 of the position detecting sensor 2, an area of contact of the sensor section 20 with the elastic protective conductor 72 at the end of the central electrode 7 is reduced. However, when the amplification factor of the variable signal amplification factor circuit 420 is increased by manually adjusting the slide operating section 46, even in the case of the light touch, the position detecting sensor 2 can detect the position indicator 1 with high sensitivity.

Conversely, in a state of the central electrode 7 of the position indicator 1 strongly touching the surface of the sensor section 20 of the position detecting sensor 2, an area of contact of the sensor section 20 with the elastic protective conductor 72 at the end of the central electrode 7 is increased. However, when the amplification factor of the variable signal amplification factor circuit 420 is decreased by manually adjusting the slide operating section 46, even in the case of the strong touch, the position detecting sensor 2 can detect the position indicator 1 stably as if the position indicator 1 is moderately touching the sensor surface.

Incidentally, in the above-described embodiment, the variable signal amplification factor circuit 420 of the signal enhancing processing circuit is configured such that the amplification factor can be changed continuously by the variable resistor 422. However, the variable signal amplification factor circuit 420 may be configured such that the amplification factor can be changed stepwise by selecting a plurality of resistors having different resistance values by a slide switch.

The position indicator 1 according to the first embodiment described above is configured such that the peripheral electrode 6 is set as a first electrode to receive the AC signal from the position detecting sensor 2 and such that the central electrode 7 is set as a second electrode to feed back an enhanced output AC signal to the position detecting sensor 2. However, the central electrode 7 may be set as the first electrode for receiving the AC signal from the position detecting sensor 2, and the peripheral electrode 6 may be set as the second electrode for feeding back an enhanced output AC signal to the position detecting sensor 2.

Second Embodiment

In the position indicator 1 according to the first embodiment described above, the first electrode is the peripheral electrode 6, and the second electrode is the central electrode 7. However, it has been found that this configuration causes the following problems depending on the configuration of the position detecting sensor 2.

In the position detecting sensor 2 used in the first embodiment, the transmitting conductors 23Y and the receiving conductors 24X are both linear conductors. On the other hand, a sensor section 20A of a position detecting sensor 2A in the example of FIG. 5 includes transmitting conductors $230Y_1$, $230Y_2$, $230Y_{64}$ that do not have a linear shape but have a wide width. Other configurations are similar to those of the first embodiment. Specifically, receiving conductors of the sensor section 20A are linear receiving conductors $24X_1$, $24X_2$, $24X_{64}$ as in the first embodiment. In the sensor section 20A in the present example, the plurality of transmitting conductors $230Y_1$, $230Y_2$, $230Y_{64}$ are connected to a transmitting section 21, and the plurality of receiving conductors $24X_1$, $24X_2$, $24X_{64}$ are connected to a receiving section 22.

Figure 5:
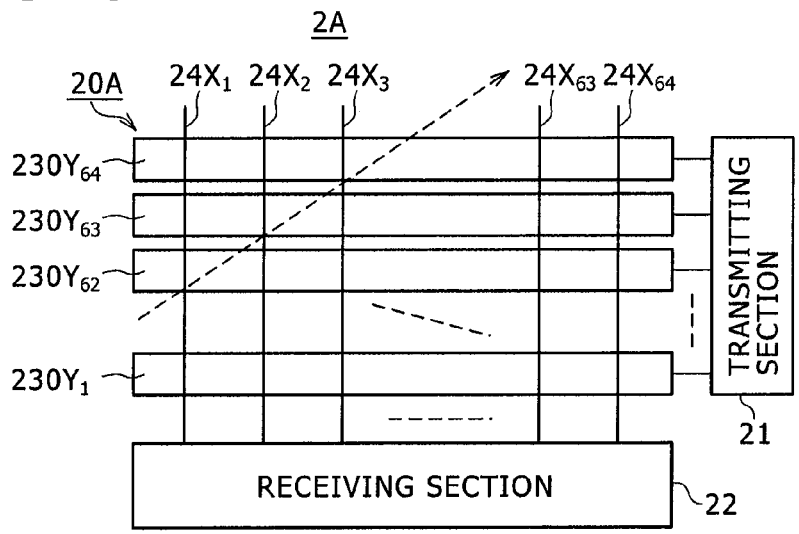
FIG. 5 is a diagram explaining another example of the position detecting sensor with which the position indicator according to the present invention is used.

In the position detecting sensor 2A of such a configuration, when a central electrode 7 is situated between two receiving conductors $24X_i$ and $24X_{i+1}$ adjacent to each other while the position indicator 1 is moved in an oblique direction indicated by a dotted line arrow in FIG. 5, because the second electrode for feeding back an AC signal to the position detecting sensor 2A is the central electrode 7, the central electrode 7 functions to feed back a larger part of the AC signal to one of the receiving conductors $24X_i$ and $24X_{i+1}$ that is closer to the central electrode 7.

Thus, when the position indicator 1 is moved linearly in the oblique direction, a problem occurs in that the position detecting sensor 2A detects the locus of movement of the position indicator 1 as a meandering locus.

In order to remedy this problem, it suffices to set the central electrode 7 in the position indicator as the first electrode for receiving the AC signal from the position detecting sensor 2A and set the peripheral electrode 6 in the position indicator as the second electrode for feeding back an enhanced AC signal to the position detecting sensor 2A.

Specifically, because the transmitting conductors $230Y_1$, $230Y_2$, $230Y_{64}$ are conductors having a wide width, the AC signal can be received uniformly even when the central electrode 7 is set as the first electrode for receiving the AC signal. On the other hand, when the peripheral electrode 6 is set as the second electrode for feeding back an enhanced AC signal to the position detecting sensor 2, the peripheral electrode 6 has a larger area of electric engagement with the position detecting sensor 2 than the central electrode 7. Thus, even when the position indicator is situated between two receiving conductors $24X_i$ (i is an integer equal to or more than one) (i=1, 2, . . . , 63, which is true also in the following) and $24X_{i+1}$ adjacent to each other, the peripheral electrode 6 and the two receiving conductors $24X_i$ and $24X_{i+1}$ adjacent to each other can be respectively set in substantially similar capacitive coupling relations. Thus, even when the position indicator is moved in the oblique direction as indicated by the dotted line arrow in FIG. 5, the meandering of the locus of movement of the position indicator is prevented, and the position detecting sensor 2A can sense the locus of movement of the position indicator as a linear locus.

Figure 6:
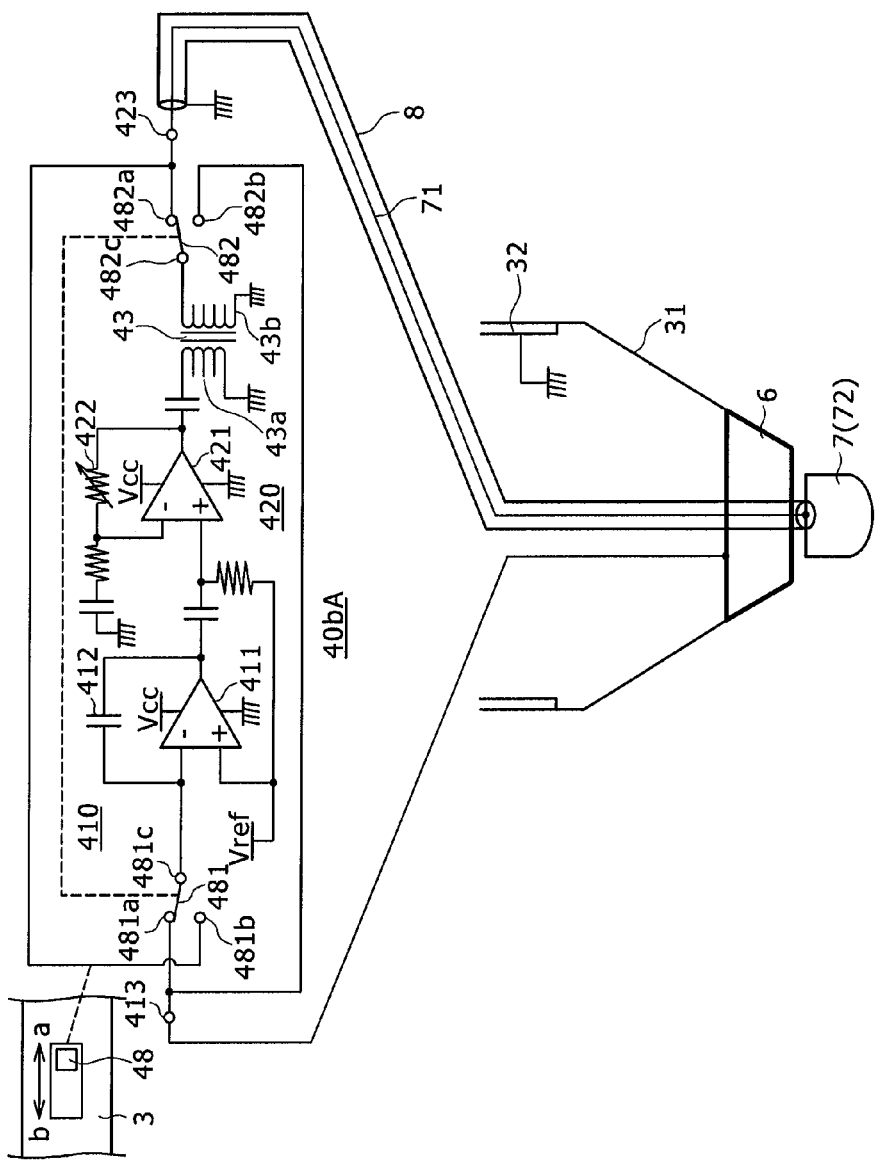
FIG. 6 is a circuit diagram showing an example of a part of a signal processing circuit in a second embodiment of the position indicator according to the present invention.

In consideration of the above, in the second embodiment, the peripheral electrode 6 and the central electrode 7 of the position indicator 1 can be switched to the second electrode and the first electrode, respectively. FIG. 6 is a diagram showing a configuration of a signal processing section 40bA of a signal processing circuit 4A in a position indicator 1A according to the second embodiment. In FIG. 6, the same parts as in the signal processing section 40b of the signal processing circuit 4 according to the first embodiment shown in FIG. 3 are identified by the same reference numerals.

Specifically, in the signal processing section 40bA, a connecting terminal 413 connected with the peripheral electrode 6 is connected to one input terminal 481a of a switch 481, and connected to another input terminal 482b of a switch 482. In addition, a connecting terminal 423 connected with the central electrode 7 is connected to another input terminal 481b of the switch 481, and connected to one input terminal 482a of the switch 482.

The movable contact 481c of the switch 481 is connected to the inverting input terminal of an operational amplifier 411. The movable contact 482c of the switch 482 is connected to one end of the secondary winding 43b of a transformer 43. Otherwise, the signal processing section 40bA is formed in the same manner as the signal processing section 40b described earlier.

In addition, as shown in the vicinity of the connecting terminal 413 in FIG. 6, a switching operating element 48 for manually switching switches 481 and 482, which operate in an interlocked manner with each other, is provided so as to be exposed to the outside in a part of the casing 3 of the position indicator 1A according to the second embodiment.

When the user positions the switching operating element 48 to an "a" side by performing a sliding movement of the switching operating element 48 in the direction of an arrow, the switches 481 and 482 are switched to the side of one input terminal 481a and the side of one input terminal 482a in an interlocked manner. Then, the connecting terminal 413 connected with the peripheral electrode 6 is connected to the inverting input terminal of the operational amplifier 411, and the connecting terminal 423 connected with the central electrode 7 is connected to one end of the secondary winding 43b of the transformer 43, so that the position indicator 1A operates in the same manner as in the first embodiment.

When the user positions the switching operating element 48 to a "b" side, on the other hand, the switches 481 and 482 are switched to the side of the other input terminal 481b and the side of the other input terminal 482b in an interlocked manner. Then, the connecting terminal 423 connected with the central electrode 7 is connected to the inverting input terminal of the operational amplifier 411, and the connecting terminal 413 connected with the peripheral electrode 6 is connected to one end of the secondary winding 43b of the transformer 43.

Thus, a part of the AC signal from the position detecting sensor 2A is input to the signal processing section 40bA of the signal processing circuit 4A of the position indicator 1A via the central electrode 7. Then, the AC signal set in opposite phase and enhanced by the signal processing section 40bA is fed back to the position detecting sensor 2A via the peripheral electrode 6. Thereby, as in the first embodiment, the position detecting sensor 2A can detect a position indicated by the position indicator 1A with high sensitivity.

The transmitting conductors and the receiving conductors of the position detecting sensor are not limited to the above examples. Receiving conductors having a wide width or transmitting conductors and receiving conductors both having a wide width may also be used. According to the second embodiment, the user can change the peripheral electrode 6 and the central electrode 7 to the first electrode or the second electrode by the switching operating element 48 according to differences in configuration of these position detecting sensors. Thus, when the position indicator according to the second embodiment is used, various position detecting sensors having different configurations of transmitting conductors and receiving conductors can detect the position indicator whose dependence on the position detecting sensors is reduced and which is highly versatile, with higher sensitivity, while avoiding problems corresponding to the different configurations.

Third Embodiment

In the above first and second embodiments, the signal processing sections 40b and 40bA of the signal processing circuits 4 and 4A form a signal enhancing processing circuit with the variable signal amplification factor circuit 420 provided in a stage subsequent to the sense amplifier 410. However, the signal enhancing processing circuit can be of other configurations.

Figure 7:
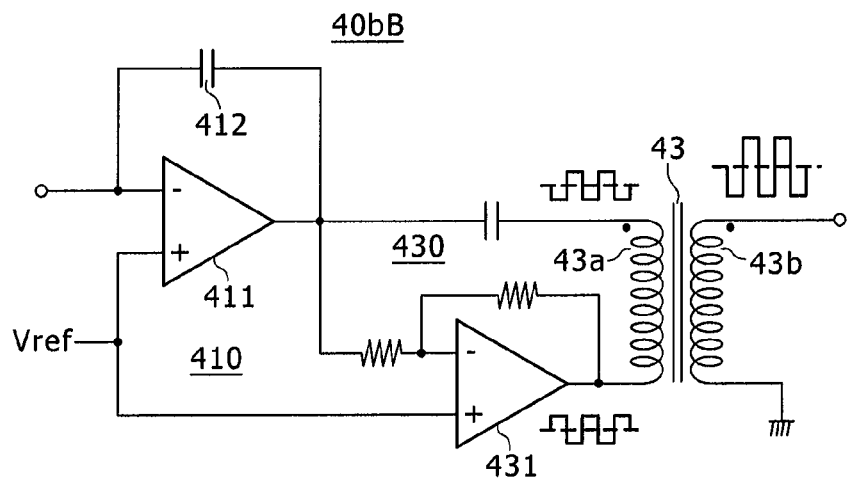
FIG. 7 is a circuit diagram showing an example of a part of a signal processing circuit in a third embodiment of the position indicator according to the present invention.

A third embodiment is a first example of the signal enhancing processing circuit, which enhances an output voltage without using the variable signal amplification factor circuit 420. FIG. 7 is a circuit diagram showing an example of configuration of a signal processing section 40bB of a signal processing circuit 4B in the case of a position indicator according to the third embodiment.

As shown in FIG. 7, the signal processing section 40bB includes a sense amplifier 410 and an enhancing circuit 430. The enhancing circuit 430 includes a transformer 43 and an inverting amplifier circuit 431. The output of the sense amplifier 410 is supplied to one end side of the primary winding 43a of the transformer 43 with polarity unchanged, while the output of the sense amplifier 410 is also inverted in polarity by the inverting amplifier circuit 431 and then supplied to the other end side of the primary winding 43a of the transformer 43.

Specifically, because the output signal of the sense amplifier 410 is supplied to both one end and the other end of the primary winding 43a of the transformer 43 in opposite phases from each other, the secondary winding 43b of the transformer 43 obtains a signal as a result of amplifying the amplitude of the output signal of the sense amplifier 410. Incidentally, a reference voltage Vref is supplied to the respective non-inverting input terminals of the operational amplifier 411 and the inverting amplifier circuit 431.

Thus, according to the signal processing section 40bB according to the third embodiment, the enhancing circuit 430 using the transformer 43 can output a signal obtained by enhancing the input signal to the enhancing circuit 430 even with a lower power supply voltage.

Incidentally, in FIG. 7, phase and amplitude relation in the case where the signal to be processed is a rectangular wave signal is shown for reference. However, the waveform of the signal as an object of processing in the signal processing section 40bB is not limited to rectangular waves, but may be a signal of any waveform such as that of a sine wave or the like as long as the signal is an AC signal.

Fourth Embodiment

Figure 8:
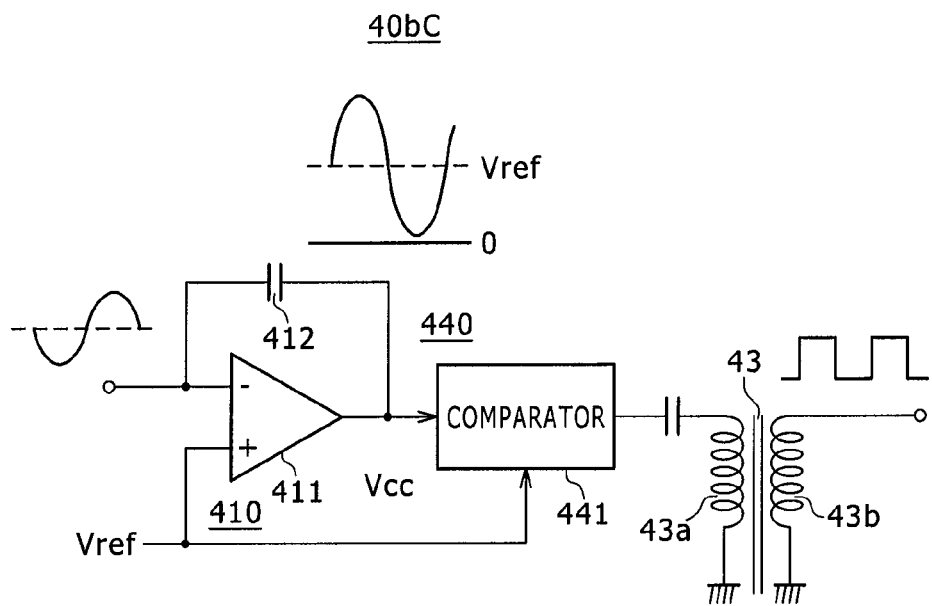
FIG. 8 is a circuit diagram showing an example of a part of a signal processing circuit in a fourth embodiment of the position indicator according to the present invention.

A fourth embodiment is a second example of realizing a signal enhancing processing circuit without using the variable signal amplification factor circuit 420. FIG. 8 is a circuit diagram showing an example of configuration of a signal processing section 40bC of a signal processing circuit 4C in the case of a position indicator according to the fourth embodiment.

As shown in FIG. 8, the signal processing section 40bC includes a sense amplifier 410 and a waveform converting circuit 440. In the example of FIG. 8, the waveform converting circuit 440 is formed by a comparator circuit 441. In the fourth embodiment, the sense amplifier 410 has a high amplification factor, which may be an amplification factor such that an output voltage value is saturated, for example.

The comparator circuit 441 is a waveform converting circuit for comparing an AC signal amplified to a large amplitude by the sense amplifier 410 with a reference voltage Vref, and generating a rectangular wave signal, which has a high level in a section where the amplified signal level is equal to or higher than the reference voltage Vref and which has a low level in other amplified signal level sections.

The rectangular wave signal from the comparator circuit 441 is further multiplied (boosted) by a transformer 43, and then output as an output signal of the signal processing section 40bC.

Thus, the signal processing section 40bC according to the fourth embodiment can provide an enhanced output signal by converting an input signal into a rectangular wave signal.

Incidentally, it is needless to say that a method for converting the input signal into the rectangular wave signal is not limited to a method represented in FIG. 8.

Fifth Embodiment

In the signal processing sections 40b and 40bA according to the first and second embodiments described above, the variable signal amplification factor circuit 420 in a stage subsequent to the sense amplifier 410 is configured to allow the user to change the amplification factor manually. However, the variable signal amplification factor circuit 420 can be configured to control the amplification factor automatically. The fifth embodiment is an embodiment in that case. FIG. 9 is a circuit diagram showing an example of a configuration of a signal processing section 40bD in the fifth embodiment.

As shown in FIG. 9, the signal processing section 40bD includes a sense amplifier 410 and an automatic gain adjusting circuit 450. The automatic gain adjusting circuit 450 in the present example includes a gain-controlled amplifier 451 of a voltage-controlled type and an output level detecting circuit 452.

The output signal of the sense amplifier 410 is supplied to the gain-controlled amplifier 451. Then, the output level detecting circuit 452 detects the level of the output signal of the gain-controlled amplifier 451, generates a gain adjusting voltage for the gain-controlled amplifier 451, and supplies the gain adjusting voltage to the control terminal of the gain-controlled amplifier 451. The gain-controlled amplifier 451 is adjusted in gain by the gain adjusting voltage from the output level detecting circuit 452 so that the level of the output signal of the gain-controlled amplifier 451 is constant at all times. Then, the output signal of the gain-controlled amplifier 451 is boosted by a transformer 43, and output as the output signal of the signal processing section 40bD.

When indicating a position by holding the position indicator 1 in contact with the position detecting sensor 2, the user performs an indicating operation according to the user's preferences or the like, by for example holding the position indicator 1 in strong contact with the position detecting sensor 2 or holding the position indicator 1 in light contact with the position detecting sensor 2. However, according to the fifth embodiment, the position detecting sensor 2 can detect the position indicator 1 with optimum sensitivity at all times irrespective of differences in the users' manner of indicating operations.

Sixth Embodiment

In the first to fifth embodiments described above, because a current through a coupling capacitance occurring between the position indicator 1 and the position detecting sensor 2 is the input signal to the sense amplifier 410, the sense amplifier 410 uses a configuration in which the capacitor 412 is connected between the input and output terminals of the operational amplifier 411, which is common with circuits of this kind.

In this configuration, however, the output signal of the sense amplifier 410 has a blunted (dull) waveform compared to the waveform of the input signal of the sense amplifier 410, and a phase delay occurs. Thus, when the receiving section 22 in the position detecting sensor 2 detects a change in a received signal, by detecting an AC signal supplied to a transmitting conductor based on the received signal obtained in a receiving conductor by synchronous detection or correlation operation, it can be difficult to detect the change with high accuracy.

The sixth embodiment is an example in which a signal processing circuit is formed so as to be able to avoid this problem. FIG. 10A is a circuit diagram showing an example of a configuration of a signal processing section 40bE of a signal processing circuit 4E in the sixth embodiment.

As with the signal processing section 40b according to the first embodiment, the signal processing section 40bE of the signal processing circuit 4E in the sixth embodiment includes a sense amplifier 460 and a variable signal amplification factor circuit 420 as a signal enhancing processing circuit. However, in the sixth embodiment, the sense amplifier 460 includes an operational amplifier 461 and a resistor 462 connected between the inverting input terminal and the output terminal of the operational amplifier 461. That is, this circuit configuration is equal to the configuration in the first embodiment, except that the resistor 462 is connected in place of the capacitor 412 connected between the inverting input terminal and the output terminal of the operational amplifier 461. The signal processing section 40bE is otherwise similar to the signal processing section 40b according to the first embodiment.

According to the configuration of the signal processing section 40bE according to the sixth embodiment, a coupling capacitance between the position indicator 1 and the position detecting sensor 2, and the resistor 462 connected between the input and output terminals of the operational amplifier 461 in the sense amplifier 460, together convert an AC signal input from the position detecting sensor 2 to the position indicator 1 into a signal in which high-frequency components are emphasized in the sense amplifier 460. For example, when the AC signal supplied from the transmitting section 21 in the position detecting sensor 2 is a rectangular wave signal as shown in FIG. 10B, the waveform of the output signal of the sense amplifier 460 is a differential waveform whose rising edge and falling edge are emphasized, as shown in FIG. 10C.

In addition, at this time, because the resistor 462 is connected to the input and output terminals of the operational amplifier 461 in place of the capacitor 412, the output signal of the sense amplifier 460 is a phase-compensated signal free from a phase delay with respect to the input signal of the sense amplifier 460, as shown in FIGS. 10B and 10C. That is, the sense amplifier 460 including the operational amplifier 461 provided with the resistor 462 functions also as a phase compensating circuit or a phase control circuit.

As in the first embodiment, the output signal of the sense amplifier 460 is supplied to the variable signal amplification factor circuit 420 to be further enhanced. Then, the enhanced AC signal is fed back from the position indicator 1 to the position detecting sensor 2.

As is understood from the above description, the sense amplifier in the sixth embodiment forms a high-frequency emphasizing circuit, while also forming a phase compensating circuit that eliminates a phase delay. Thus, according to the sixth embodiment, even when the receiving section 22 in the position detecting sensor 2 detects a change in a received signal by detecting an AC signal supplied to a transmitting conductor based on the received signal obtained in a receiving conductor by synchronous detection or correlation operation, it is possible to detect the change with high accuracy.

Incidentally, while description has been made of a case where the AC signal used in the position detecting sensor 2 is a rectangular wave signal with reference to FIGS. 10B and 10C, there is no limitation to the waveform of the AC signal, and the AC signal may be an AC signal of any waveform, such as a sine wave signal or the like.

In addition, while the example of FIG. 10A is a case where the sixth embodiment is applied to the sense amplifier of the signal processing section 40b according to the first embodiment, the sixth embodiment is also applicable to the sense amplifiers of the signal processing sections according to the second to fifth embodiments.

Other Examples of Shielding between Peripheral Electrode 6 and Central Electrode 7

As described in the first embodiment, a low capacitance between the peripheral electrode 6 and the central electrode 7 is favorable for improvement in sensitivity to the position indicator 1. Therefore, in the first embodiment, the capacitance between the peripheral electrode 6 and the central electrode 7 is minimized by surrounding the central electrode 7 with the shielding member 8.

Figure 11A:
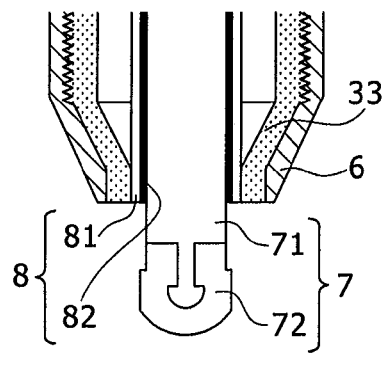
FIGS. 11A, 11B, and 11C are diagrams explaining other examples of a shielding member interposed between a first electrode and a second electrode in an embodiment of the position indicator according to the present invention.

In the first embodiment, as shown in FIGS. 2A to 2C, the shielding member 8 is formed so as to penetrate through the peripheral electrode 6 and cover the central electrode 7. That is, the shielding member 8 is provided also over a part on the side of the central electrode 7 penetrating beyond the peripheral electrode 6. However, it suffices for the shielding member 8 to exert a shielding effect on at least a part where the peripheral electrode 6 and the central electrode 7 are in proximity to each other. Therefore, as shown in FIG. 11A, the shielding member 8 may be formed so as to cover the central electrode 7 in a position up to an end part of the peripheral electrode 6 on the side of the central electrode 7 or the vicinity of the end part.

Figure 11B:
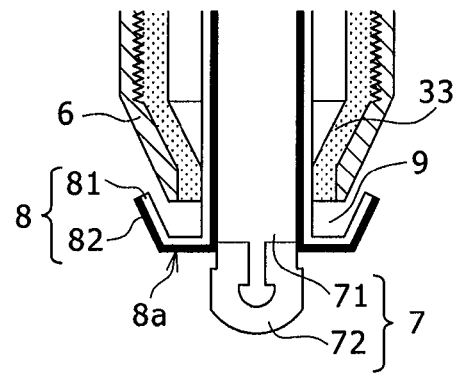
Figure 11C:
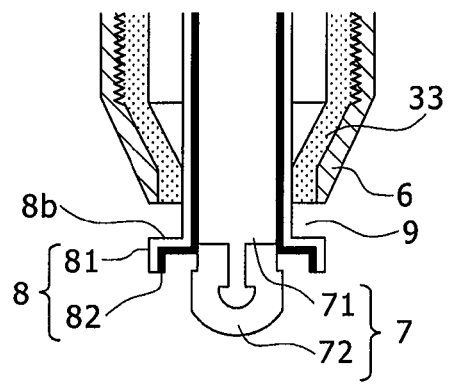

In addition, to further reduce the capacitance between the peripheral electrode 6 and the central electrode 7 by enhancing the shielding effect, collar sections 8a and 8b may be formed at the end part of the shielding member 8 penetrating the peripheral electrode 6, as shown in FIGS. 11B and 11C. The effect of shielding between the peripheral electrode 6 and the central electrode 7 can be further enhanced by folding the collar section 8a so as to cover the end part of the peripheral electrode 6 as shown in FIG. 11B, or folding the collar section 8b so as to surround the central electrode 7, as shown in FIG. 11C.

In addition, in the cases of FIGS. 11B and 11C, an air space 9 is interposed by providing an air gap between the collar sections 8a and 8b and the peripheral electrode 6 and the tapered section 33 formed of an insulating material. Thus, the effect of shielding between the peripheral electrode 6 and the central electrode 7 can be further enhanced. Incidentally, a predetermined dielectric may be interposed in place of the air space 9. For example, the tapered section 33 formed of a synthetic resin may be extended to the collar sections 8a and 8b.

Other Embodiments and Examples of Modification

In the above embodiments, description has been made of a capacitance type detecting sensor of a mutual capacitance system, which only detects the coupling capacitance part (XY coordinates) of a touch point between transmitting conductors, to which an AC signal is input, and receiving conductors separated from the transmitting conductors for receiving an AC signal. However, the present invention is similarly applicable to a capacitance type detecting sensor of a self-capacitance system in which the same conductors are used for both inputting and outputting an AC signal.

In addition, description has been made of a case where a battery is used as a power supply for the position indicator. However, power may for example be supplied from the side of the capacitance type detecting sensor by a wireless system without a battery being provided. For example, as described in Japanese Patent Laid-Open No. 2007-164356, a configuration may be adopted, in which a resonant circuit producing electromagnetic coupling with a capacitance type detecting sensor and a capacitor, such as an electric double layer capacitor or the like, are provided in a position indicator, and a driving voltage for use is generated from a voltage with which the capacitor is charged.

In addition, in the foregoing embodiments, a transformer for increasing the signal level is provided on the output side of a signal enhancing processing circuit. However, needless to say, a signal enhancing circuit formed by a semiconductor circuit may be provided in place of the transformer.

Incidentally, in the foregoing embodiments, the conductor section 32 on the periphery of the casing 3 of the position indicator is connected directly (in terms of a direct current) to the grounding conductor of the printed wiring board 41 on which the signal processing circuit 4 is formed within the casing of the position indicator. However, coupling between the grounding conductor of the internal circuit and the conductor section 32 may be provided via a capacitor in terms of an alternating current.

In addition, in the foregoing embodiments, the conductor section 32 is formed so as to cover substantially the entire periphery of the casing 3 of the position indicator excluding a part insulated from the peripheral electrode. However, a conductive member such as a metallic sheet or the like connected to the grounding conductor of the internal circuit may be disposed on only a predetermined part of the casing 3 to be held by a user so as to be in contact with the human body when the user operates the position indicator.

In addition, when the casing 3 is formed by plastic, for example, the conductor section 32 can be omitted by using a plastic having conductivity and connecting the plastic to the grounding conductor of the internal circuit in terms of a direct current or in terms of an alternating current.

Incidentally, the position detecting sensor with which the position indicator according to the present invention is used is not limited to tablets, but may be various position detecting sensors used in position detecting devices of various portable terminals, such as pad type terminals and the like and other stationary devices.

The invention claimed is:

1. A position indicator for use in conjunction with a position detecting sensor that carries out position detection by detecting a change in capacitance, the position indicator comprising:
   a first electrode configured to receive an alternating-current (AC) signal from the position detecting sensor;
   a signal enhancing processing circuit configured to subject the AC signal received via the first electrode to determined signal enhancing processing; and
   a second electrode different from the first electrode and configured to be supplied with an enhanced signal output from the signal enhancing processing circuit;
   wherein the first electrode and the second electrode are both disposed at the same end section of the position indicator,
   wherein the enhanced signal having a determined correlation with the AC signal received via the first electrode from the position detecting sensor is formed while the enhanced signal is sent out to the position detecting sensor via the second electrode, and
   wherein the signal enhancing processing circuit generates the enhanced signal having a signal level higher than a signal level of the AC signal received via the first electrode.

2. The position indicator according to claim 1, characterized by further comprising a connection changing circuit configured to switch the first electrode and the second electrode with each other as an electrode for signal reception and an electrode for signal transmission.

3. The position indicator according to claim 1, characterized in that:
   the signal level of the enhanced signal generated by the signal enhancing processing circuit is increased in at least one of a region of a rising edge of a waveform of the enhanced signal and a region of a falling edge of the waveform of the enhanced signal.

4. The position indicator according to claim 1, characterized in that:
   the enhanced signal generated by the signal enhancing processing circuit results from performing determined phase control on the AC signal received via the first electrode.

5. The position indicator according to claim 4, characterized in that:
   the determined phase control is compensation for a phase of the AC signal received via the first electrode.

6. The position indicator according to claim 1, characterized in that:
   the signal enhancing processing circuit subjects a signal waveform of the AC signal received via the first electrode to waveform conversion.

7. The position indicator according to claim 6, characterized in that:
   the signal enhancing processing circuit converts the signal waveform of the AC signal received via the first electrode into a rectangular waveform.

8. The position indicator according to claim 1, characterized in that:
   the signal enhancing processing circuit includes a variable signal amplification factor circuit configured to control a signal level of the AC signal received via the first electrode.

9. The position indicator according to claim 8, characterized in that:
   the variable signal amplification factor circuit is an automatic gain adjusting circuit configured to output a signal having a constant signal level against variations in the signal level of the AC signal received via the first electrode.

10. The position indicator according to claim 9, characterized in that:
    the variable signal amplification factor circuit is a manually variable amplification factor circuit configured to increase the signal level of the AC signal received via the first electrode with a determined amplification factor.

11. The position indicator according to claim 1, characterized in that:
    a shielding member is disposed between the first electrode and the second electrode for preventing electrical interference therebetween.

12. The position indicator according to claim 11, characterized in that:
    the shielding member surrounds at least one electrode of the first electrode and the second electrode, and is electrically grounded.

13. The position indicator according to claim 11, characterized in that:
    the position indicator has a shape of a stylus and the second electrode is disposed so as to surround the first electrode, and the shielding member surrounds the first electrode and is disposed between the first electrode and the second electrode.

14. The position indicator according to claim 13, characterized in that:
    one end section of the shielding member is disposed so as to project from the second electrode in a longitudinal direction of the position indicator, and a collar section is formed at the one end section.

* * * * *